United States Patent [19]

Hähnke et al.

[11] Patent Number: 4,705,524
[45] Date of Patent: Nov. 10, 1987

[54] MIXTURES OF WATER-SOLUBLE FIBER-REACTIVE DYES AND USE THEREOF FOR DYEING: DIOXAZINE AND DISAZO DYES

[75] Inventors: Manfred Hähnke, Kelkheim, Fed. Rep. of Germany; Marcos Segal, Suzano, Brazil

[73] Assignee: Hoechst Aktiengesellschaft, Frankfurt, Fed. Rep. of Germany

[21] Appl. No.: 934,688

[22] Filed: Nov. 25, 1986

[30] Foreign Application Priority Data

Nov. 28, 1985 [DE] Fed. Rep. of Germany ....... 3542025

[51] Int. Cl.$^4$ .................. C09B 67/00; C09B 67/22; D06P 1/38
[52] U.S. Cl. .................................. 8/527; 8/549; 8/638; 8/639; 8/641; 8/644; 8/658; 8/681; 8/687; 8/688; 8/917; 8/918; 8/924
[58] Field of Search ................. 8/549, 641, 644, 527

[56] References Cited

U.S. PATENT DOCUMENTS

| | | | |
|---|---|---|---|
| 3,669,951 | 6/1972 | Bien et al. | 8/549 |
| 3,910,758 | 10/1975 | Bien et al. | 8/549 |
| 4,257,770 | 3/1981 | Mshimura et al. | 8/549 |
| 4,314,818 | 2/1982 | Courtin | 8/549 |
| 4,492,654 | 1/1985 | Hoyer et al. | 534/827 |
| 4,577,015 | 3/1986 | Jager et al. | 8/657 |
| 4,591,643 | 5/1986 | Jager | 544/76 |
| 4,629,788 | 12/1986 | Jager | 544/76 |

FOREIGN PATENT DOCUMENTS 1183661 3/1970 United Kingdom .
2029850 3/1980 United Kingdom .

*Primary Examiner*—A. Lionel Clingman
*Attorney, Agent, or Firm*—Connolly and Hutz

[57] ABSTRACT

The invention relates to dye compositions for preparing level dyeings on carboxamide- or hydroxyl-containing fiber materials of comparatively good light fastness properties, which contain dioxazine dyes I (Ia and/or Ib) and II (one or more of IIa to IId) in a weight ratio of 90:10 to 10:90

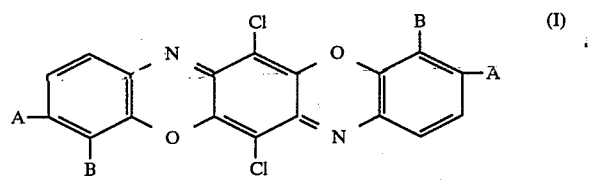

Ia: A = —NR$^1$R$^2$; B = —SO$_2$Z

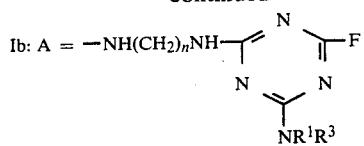

Ib: A = —NH(CH$_2$)$_n$NH—

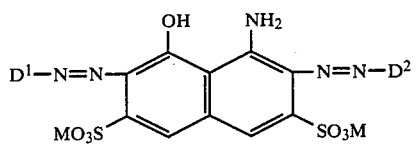

(II)

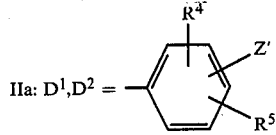

IIa: D$^1$,D$^2$ =

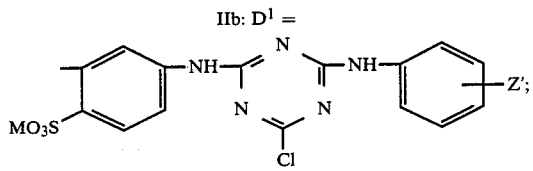

IIb: D$^1$ =

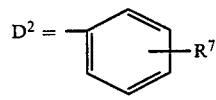

D$^2$ =

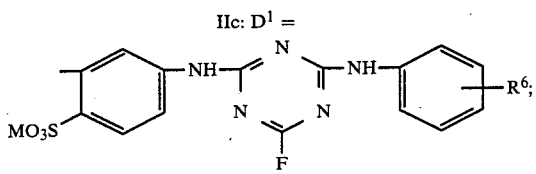

IIc: D$^1$ =

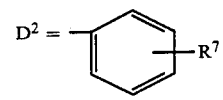

D$^2$ =

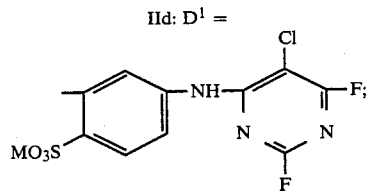

IId: D$^1$ =

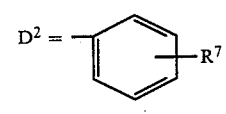

D$^2$ = where in each case independently of one another
Z denotes vinyl or β-sulfatoethyl,
Z' denotes vinyl-SO$_2$ or β-sulfatoethyl-SO$_2$—,
R denotes sulfo or —SO$_2$—NR$^8$R$^9$, wherein R$^8$ is H or substituted or unsubstituted C$_1$-C$_4$-alkyl and R$^9$ is H, C$_1$-C$_4$-alkyl which can be substituted by sul- (Abstract continued on next page.)

fato, sulfo, carboxyl or phosphato, or is an arylated $C_1$–$C_4$-alkyl group which can be substituted in the aryl radical by sulfo or carboxyl, $R^1$ denotes H or substituted or unsubstituted $C_1$–$C_4$-alkyl, $R^2$ denotes $C_1$–$C_4$-alkyl which can be substituted by sulfato, suflo, carboxyl or phosphato, or optionally sulfo- or carboxyl-substituted aryl or alkylaryl having 1 to 4 carbon atoms in the alkyl radical, $R^3$ $C_1$–$C_4$-alkyl which can be substituted by sulfato, sulfo, carboxyl or phosphato, or denotes phenyl which is substituted by sulfo or carboxyl, $R^4$ and $R^5$ denote H, sulfo, carboxyl, $C_1$–$C_4$-alkyl, $C_1$–$C_4$-alkoxy or Br, $R^6$ denotes $C_1$–$C_4$-alkyl, —OH, sulfo, carboxyl or Cl, $R^7$ denotes sulfo, carboxyl or —$SO_2$—$NR^8R^9$, where $R^8$ and $R^9$ have the abovementioned meaning, n denotes 1, 2 or 3 and M denotes H or an alkali metal.

14 Claims, No Drawings

MIXTURES OF WATER-SOLUBLE FIBER-REACTIVE DYES AND USE THEREOF FOR DYEING: DIOXAZINE AND DISAZO DYES

The invention relates to the technical field of fiber-reactive dyes.

European patent application Publication Nos. 0,101,665, 0,141,996 and 0,144,580 disclose water-soluble dioxazine dyes which have a β-sulfatoethylsulfonyl, vinylsufonyl, monofluorotriazinyl or chlorodifluoropyrimidyl reactive group. These dyes are distinguished—in particular under the alkaline conditions required for fixing fiber-reactive dyes—by a high affinity and reactivity toward the cellulose fiber, which is why, when dyeing by the exhaust method, the absorption of the dyes onto the fiber and in particular the fixation thereof on the fiber take place so rapidly that the resulting dyeings do not always have a sufficient levelness. A further disadvantage of the dyes of European patent application Publication No. 0,141,996 is that dyeings thereof on cellulose fiber materials, such as cotton, have only a moderate to poor resistance to domestically customary perborate-containing washing agents.

Furthermore, fiber-reactive navy disazo dyes whose dyeings on cellulose fiber materials merely have a moderate to poor light fastness are known for example from Example 11 of British patent application Publication No. 2,029,850, Example 1 of German Offenlegungsschrift No. 3,029,699, Example 1 of German Offenlegungsschrift No. 3,113,989, Example 1 of U.S. Pat. No. 4,412,948 and from the Colour Index as C.I. Reactive Black 5.

It has now been found that the disadvantages of these dyes are substantially overcome by a mixture of fiber-reactive dyes comprising a dye of the general formulae (I) below and a dye of the general formulae (II) below. It has been found that such dye mixtures, or the simultaneous use of dyes of the formulae (I) and (II), surprisingly produce on carbamoyl-containing and in particular hydroxyl-containing fiber materials very level dyeings having still sufficiently good light fastness properties. It has been found in particular that fiber-reactive dioxazine dyes having the structure below of the general formulae (Ia) and (Ib) no longer exhibit the dyeing disadvantages if used in mixture with or together with other certain navy dyes of the general formulae (IIa), (IIb), (IIc) or (IId) which follow, or mixtures of these dyes (II).

The present invention thus relates to dye compositions in solid or dissolved form or in the dyeing form, i.e. to dyeing formulations of such dye compositions which contain, or are substantially composed of, one or more dioxazine dyes selected from dyes conforming to the general formulae (Ia) and (Ib) mentioned and defined hereinafter and one or more disazo dyes selected from dyes conforming to the general formulae (IIa), (IIb), (IIc) and (IId) mentioned and defined hereinafter.

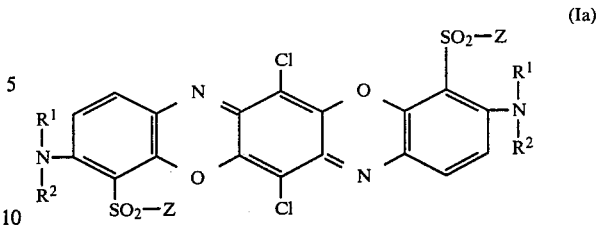

(Ia)

(Ib)

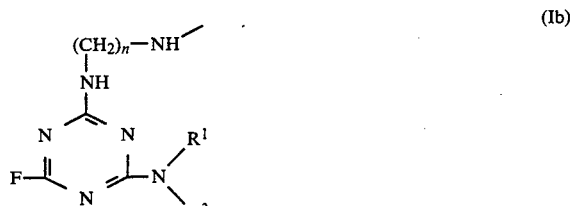

(IIa)

(IIb)

(IIc)

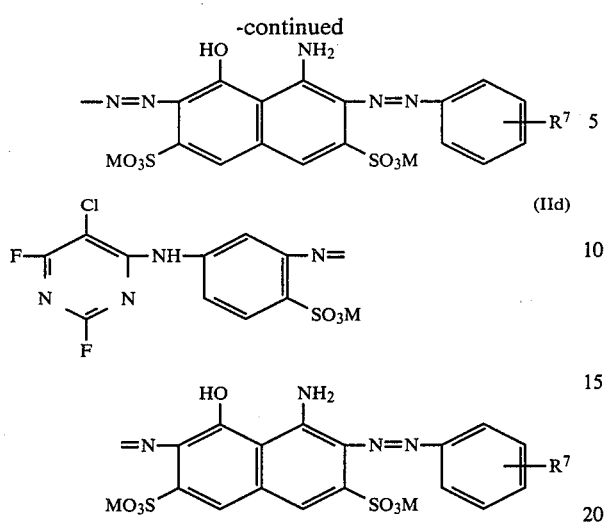

In these formulae the meanings are:

Z is the vinyl group or the β-sulfatoethyl group;

Z' is the vinyl—$SO_2$—group or the β-sulfatoethyl—$SO_2$— group;

R stands for the sulfo group or a sulfonamide group of the general formula (III)

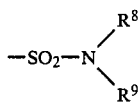

in which $R^8$ is a hydrogen atom or a substituted or unsubstituted alkyl group of 1 to 4 carbon atoms, such as, for example, an alkyl group of 1 to 4 carbon atoms, which is substituted by a sulfo, sulfato, phosphato or carboxyl group, and $R^9$ denotes an alkyl group of 1 to 4 carbon atoms which may be substituted by 1 or 2 substituents selected from sulfato, sulfo, carboxyl and phosphato, or is an aryl group, such as a phenyl or naphthyl group, which may be substituted by 1, 2 or 3 substituents selected from sulfo and carboxyl, or is an aryl-substituted alkyl group of 1 to 4 carbon atoms which may be substituted in the aryl radical, such as the phenyl or a naphthyl radical, by 1, 2 or 3 substituents selected from sulfo and carboxyl;

$R^1$ is a hydrogen atom or a substituted or unsubstituted alkyl group of 1 to 4 carbon atoms, such as, for example, an alkyl group of 1 to 4 carbon atoms which is substituted by a sulfo, sulfato, phosphato or carboxyl group;

$R^2$ is an alkyl group of 1 to 4 carbon atoms which may be substituted by 1 or 2 substituents selected from sulfato, sulfo, carboxyl and phosphato, or is an aryl group, such as a phenyl or naphthyl group, which may be substituted by 1, 2 or 3 substituents selected from sulfo and carboxyl, or is an aryl-substituted alkyl group of 1 to 4 carbon atoms which may be substituted in the aryl radical, such as the phenyl or a naphthyl radical, by 1, 2 or 3 substituents selected from sulfo and carboxyl;

$R^3$ is an alkyl group of 1 to 4 carbon atoms which may be substituted by 1 or 2 substituents selected from sulfato, sulfo, carboxyl and phosphato, preferably sulfato and sulfo, or is a phenyl group which is substituted by 1 or 2 substituents selected from sulfo and carboxyl;

$R^4$ is a hydrogen atom or a sulfo group, a carboxyl group, an alkyl group of 1 to 4 carbon atoms, of which in particular the methyl group, an alkoxy group of 1 to 4 carbon atoms, of which in particular the methoxy group, or a bromine atom;

$R^5$ is a hydrogen atom or a sulfo group, a carboxyl group, an alkyl group of 1 to 4 carbon atoms, of which in particular the methyl group, an alkoxy group of 1 to 4 carbon atoms, of which in particular the methoxy group, or a bromine atom;

$R^6$ is an alkyl group of 1 to 4 carbon atoms, of which in particular the methyl group, a hydroxyl group, a carboxyl group, a sulfo group or a chlorine atom;

$R^7$ is a sulfo group, a sulfonamide group conforming to the general formula (III) mentioned and defined above, or a carboxyl group;

n stands for the number 1, 2 or 3;

M is a hydrogen atom or preferably an alkali metal, such as sodium, potassium and lithium.

Preferably the dyes of the general formulae (I) and (II) are present in the form of the β-sulfatoethyl derivatives.

The formula members which appear two or more times in the individual formulae can in each case have the same meaning or mutually different meanings; in particular the formula members which each appear twice in the general formulae (Ia) and (Ib) preferably have in each case the same meaning. As for the rest, the various formula members can have meanings which are identical to or different from one another within the scope of the indicated meanings.

Heretofore and hereinafter, carboxyl groups are groups of the general formula —COOM with M of the abovementioned meaning; in the same way sulfo groups are groups of the general formula —$SO_3M$, phosphato groups are groups of the general formula —$OPO_3M_2$ and sulfato groups are groups of the general formula —$OSO_3M$, in each case with M of the abovementioned meaning.

In the dye mixtures according to the invention or the dye compositions used according to the invention, the dye or dyes of the general formulae (I) and the dye or dyes of the general formulae (II) are present in a ratio of 90:10 to 10:90 parts by weight; preferably the proportions of dyes (I) and (II) are within the range of 30 parts by weight of the dye or dyes of the general formulae (I) and 70 parts by weight of the dye or dyes of the general formulae (II) to 60 parts by weight of the dye or dyes of the general formulae (I) and 40 parts by weight of the dye or dyes of the general formulae (II). Particularly preferably, the dyes of the general formulae (I) and (II) are present or used for dyeing in a mixing ratio of between 30:70 and 50:50 parts by weight.

The dyes of the general formulae (I) and (II) are known or analogous to known dyes in their chemical structure, so that the dyes not yet described per se can be prepared analogously to the dyes described per se.

Dyes of the general formula (Ia) are known from European patent application Publication No. 0,141,996 and German Offenlegungsschrift No. 3,439,756; dyes of the general formula (Ib) are described in European Patent Application Publication Nos. 0,101,665A and 0,144,580A, the dyes of the general formula (IIa) in German Offenlegungsschriften Nos. 3,025,572 and 3,113,989, in British Patent No. 1,183,661 and in U.S. Pat. No 2,657,205 (columns 9/10), the dyes of the general formula (IIb) in U.S. Pat. No. 4,412,948, the dyes of the general formula (IIc) in British Patent Application Publication No. 2,029,850A and the dyes of the general formula (IId) in U.S. Pat. No. 3,669,951, in German Offenlegungsschriften Nos. 1,644,204, 3,029,699 and 3,225,370 and in European Patent Application Publication No. 0,059,782A.

The dye mixtures according to the invention can be present in solid, i.e. in particular pulverulent, form or in the form of granules. In general they additionally contain the customary electrolyte salts, such as sodium chloride, potassium chloride and sodium sulfate, which can stem from the synthesis. They can further contain buffer substances which are capable of buffering acids, such as, for example, alkali metal acetates, sodium hydrogenphosphate, disodium hydrogenphosphate and sodium borate. The dye mixtures can further contain other substances customary for dyeing formulations, such as siccatives, fungicides and dyeing assistants.

The dye compositions can also be present in the form of a liquid solution, in particular as aqueous solutions having a total dye content of dyes (I) and (II) of at least 10% by weight, preferably between 10 and 40% by weight. The solutions can likewise contain the customary and conventional additives mentioned in the preceding paragraph for the solid formulations, and preferably have a pH value between 4 and 7.

The dye mixtures according to the invention comprising the dyes of the general formulae (I) and (II) can additionally have fiber-reactive dyes of different structures and shades, with which mixed shades are obtainable on the fiber material in conventional manner.

The carbamoyl-containing materials which are dyeable with the dye compositions according to the invention in level and fast shades are for example synthetic polyamide fiber materials and wool. However, it is particularly preferred and advantageous to dye hydroxyl-containing fiber materials with the dye compositions according to the invention in level and fast shades; hydoxyl-containing fiber materials are in particular cellulose fiber materials, such as cotton.

The dye mixtures according to the invention can be prepared in conventional manner, such as, for example, by mixing the individual solid dye components which are obtainable from the synthesis by salting out or spray-drying the synthesis solution, or by mixing the synthesis solutions of the individual dye components and subsequently jointly isolating by salting out or spray-drying. Herein the customary, abovementioned additives can be added to the solutions themselves, possibly before the spray-drying thereof, or to the solid individual components or mixtures thereof.

Preferred dye compositions according to the invention are those with dyes of the general formulae (I) and (II) in which the individual formula members have the following meanings:

Z, Z', M and n have the abovementioned meanings;
R is a sulfo group or a N-($\beta$-sulfoethyl)-sulfamoyl, N-methyl-N-($\beta$-sulfoethyl)-sulfamoyl or N-($\beta$-sulfatoethyl)-sulfamoyl group;
$R^1$ is a hydrogen atom or the methyl group;
$R^2$ is a $\beta$-sulfatoethyl, $\beta$-sulfoethyl, carboxymethyl, $\beta$-carboxyethyl, $\gamma$-sulfatopropyl, $\gamma$-sulfopropyl, $\beta$-sulfatopropyl, $\beta,\gamma$-disulfatopropyl, monosulfophenyl, monosulfobenzyl or $\beta$-(monosulfophenyl)-ethyl group;
$R^3$ is the 2,5-disulfophenyl, 2,4-disulfophenyl or 4-sulfophenyl group;
$R^4$ is a hydrogen atom;
$R^5$ is a hydrogen atom or the methyl group;
$R^6$ is a chlorine atom;
$R^7$ is the sulfo group or the sulfamoyl group.

Preferred compositions according to the invention are furthermore those with one or more dyes of the general formulae (I) in which $R^2$ denotes a $\beta$-sulfoethyl, $\beta$-sulfatoethyl, $\beta$-sulfatopropyl, carboxymethyl, $\beta$-carboxyethyl, $\gamma$-carboxypropyl, monosulfophenyl, monosulfobenzyl or $\beta$-(monosulfophenyl)-ethyl group, Z stands for the $\beta$-sulfatoethyl group and $R^3$ denotes the 2,5-disulfophenyl group.

Preferred compositions according to the invention are furthermore those with one or more dyes of the general formulae (II) in which $R^4$ and $R^5$ each denote a hydrogen atom, $R^6$ is a chlorine atom in the meta-position relative to the amino group and $R^7$ denotes a sulfo group or a sulfonamide group of the general formula (III) in which $R^8$ stands for a hydrogen atom and $R^9$ has the meaning indicated for the formula (III).

Particularly preferred dye compositions are furthermore those in which, in the dyestuffs of the general formulae (I), $R^1$ stands for a hydrogen atom and R for the sulfo group.

Preference is given to dye compositions according to the invention comprising only one dye each of dye components (I) and (II).

Of the dye compositions according to the invention, in particular the following are furthermore noteworthy:
(a) compositions with a dye of the general formula (IV) and a dye of the formula (V)

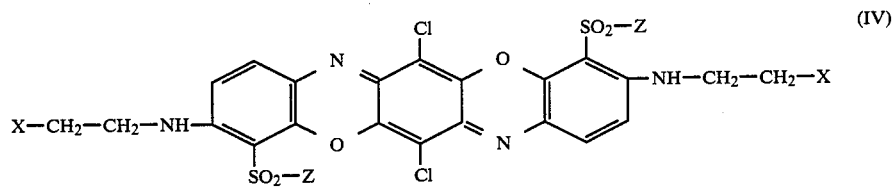

(IV)

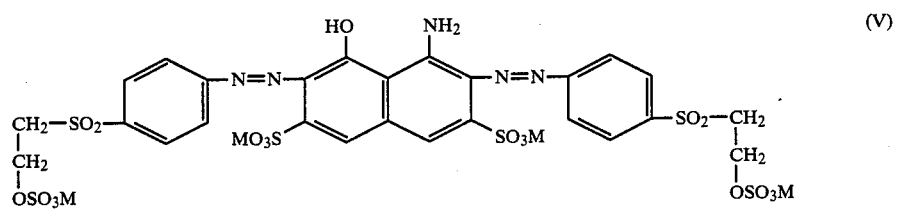

(V)

in which M and Z have the abovementioned, in particular the preferred, meanings and X stands for the sulfato or sulfo group;

(b) compositions with a dye of the general formula (IV) mentioned and defined above, and a dye of the formula (VI)

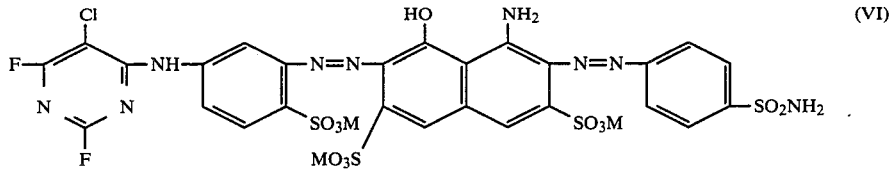

in which M has the abovementioned meaning;

(c) compositions with a dye of the formula (VII) and a dye of the formula (VIII)

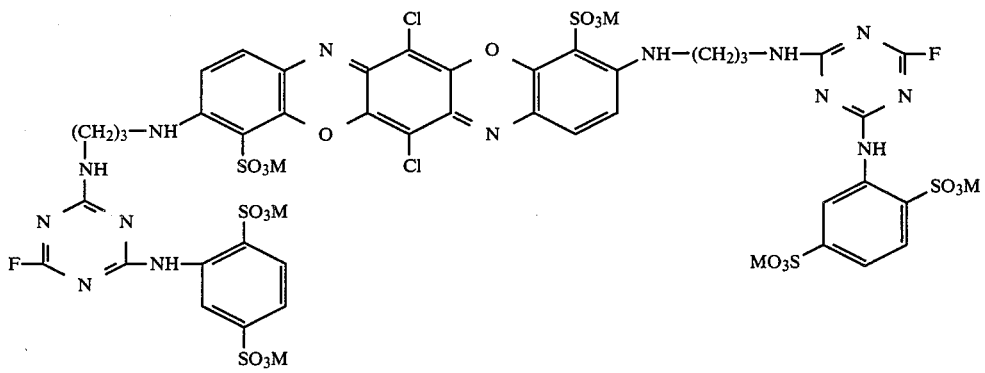

in which M has the abovementioned meaning;

(d) compositions with a dye of the formula (VII) and a dye of the formula (V);

(e) compositions with a dye of the general formula (IV) and a dye of the formula (IX)

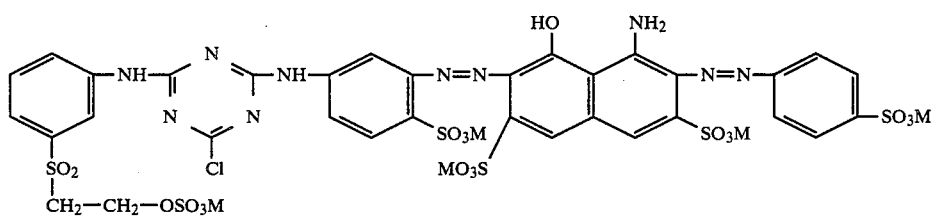

in which M has the abovementioned meaning.

The dye mixtures according to the invention can be applied by the customary application and fixing methods for fiber-reactive dyes, which are known in large numbers for example from the abovementioned literature. The dye compositions according to the invention are distinguished by a very good water solubility and have a high affinity for the substrate to be dyed, so that dyeings and prints having high depths of shade and color yields are obtained. Despite their high affinity for the fiber, the dye mixtures according to the invention surprisingly produce dyeings of high levelness, since the two dye components of the formulae (I) and (II) become homogeneously fixed on the substrate. This dyeing behavior of the dye mixtures according to the invention becomes manifest in a particularly advantageous manner in dyeing by the exhaust method from an aqueous bath, dyeing being preferably effected using a liquor ratio of 10:1 to 50:1 and a dyeing temperature of 30° to 70° C.

Preference is therefore given to exhaust dyeing in excellent color yields from an alkali medium in the presence of a very wide variety of alkali adds of the type customary for the dyeing of cellulose fibers with reactive dyes of the vinylsulfonyl type, for example sodium hydroxide, sodium carbonate or sodium bicarbonate and further dyeing assistants, such as sodium, chloride and sodium sulfate.

Very good color yields are also obtained with the known padding methods, where a dye mixture according to the invention can be fixed by means of alkali by dwelling at room temperature, by steaming or with dry heat.

To print cellulose fiber materials, it is possible to use for example the customary one-step processes in the presence of an acid-binding agent, such as sodium bicarbonate, sodium carbonate or sodium trichloroacetate, in the print paste with subsequent fixing by steaming, for example at 100°–103° C., or the two-step processes using neutral or weakly acid print pastes, after printing with which the fiber material is passed through a hot electrolyte-containing alkaline bath or is overpadded with an alkaline electrolyte-containing padding liquor and subsequently fixed by steaming or dry heat. In this way prints having well defined contours and a clear white ground are obtained.

The dye mixtures according to the invention can also be used to dye mixtures of cellulose fibers with other natural or synthetic fibers, for example mixtures of cellulose fibers with synthetic fibers, such as polyester or polyacrylic fibers. In this case the dyeing is generally carried out in two stages, the cellulose portion of the fiber mixture being dyed with a dye mixture according to the invention and the synthetic fiber portion with a suitable dye, for example a disperse dye. With certain dyes and fiber mixtures the dyeing process can also be carried out in a single stage.

The dye mixtures according to the invention produce on cellulose fiber materials dyeings or prints which have considerable fastness properties, of which in particular the important manufacturing and end-user fastness properties are noteworthy, such as light fastness, wash fastness at 60° C. and 95° C., acid and alkaline fulling fastness, water fastness, seawater fastness, acid cross-dyeing fastness, alkaline and acid perspiration fastness and the pleating, hot-press and crock fastness properties.

The dye mixtures according to the invention can also contain assistants for dyeing or printing of the type customary for the application of reactive dyes. Assistants are for example water or hydrotropic agents such as glycerol, glycol ethers, polyglycol ethers or urea, oxidizing agents to counteract the reducing action of the cellulose, such as 2,4-dinitrobenzenesulfonic acid or 3-nitrobenzenesulfonic acid, salts for increasing the degree of fixation, such as sodium chloride or sodium sulfate, or wetting agents, organic solvents or fixing agents, such as sodium hydroxide solution, sodium carbonate, sodium hydrogen carbonate, sodium silicate, trisodium phosphate.

The dye mixtures according to the invention can be used by the dyer or printer as such in the solid form or in the liquid, dissolved form. However, according to the invention it is also possible, as already mentioned at the beginning, to put or incorporate the two dye components in the indicated mixing range separately into the dyebath, the dyeing liquor or the print paste. The invention therefore relates not only to the use of dye mixtures of the general formulae (I) and (II) in the indicated mixing ratios, but also to the simultaneous use of dyes of the general formulae (I) and (II) in the indicated mixing ratios in the dyeing of carbamoyl- or preferably hydroxyl-containing fiber materials by the dyeing methods customary for fiber-reactive dyes, respectively relates to a process for dyeing in which said dye mixture or those dyes (I) and (II) are applied simultaneously to said fiber material and fixed in conventional manner, such as indicated above.

The examples below serve to illustrate the invention. The parts and percentages are by weight, unless otherwise stated; parts by weight relate to parts by volume as the kilogram relates to the liter.

EXAMPLES

Example 1

100 parts of a bleached knitted cotton fabric are introduced at 20° to 25° C. into a solution of 0.6 part of the dye of the formula (A), 1.2 parts of the dye of the formula (B) and 50 parts of sodium sulfate decahydrate in 1,000 parts of water.

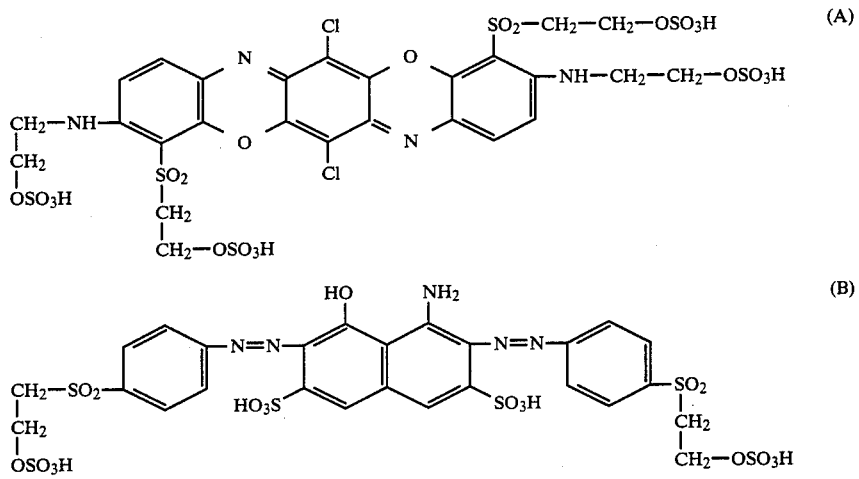

5 parts of anhydrous sodium carbonate and 2 parts of an aqueous 32% strength sodium hydroxide solution are added. With thorough agitation of the cotton material the dyebath is raised to 40° C. in the course of 15 minutes, and the dyeing is continued at that temperature for 90 minutes. Subsequently the dyed material is finished in conventional manner, for instance by rinsing with cold and warm water, by neutralizing in an aqueous bath containing dilute acetic acid, by subsequent treatment at the boil in an aqueous wash solution which contains a nonionic washing agent, by rinsing once more with warm and cold water and subsequent drying.

This gives a deep, level and lively navy dyeing having good fastness properties, such as in particular a good chlorinated water fastness and a good light fastness.

Comparative Example 1a

Example 1 is repeated, except that only 2 parts of dye (A) are used, affording a bright blue dyeing of poor levelness and covered with dark spots.

Comparative Example 1b

Example 1 is repeated, except that only 2 parts of dye (B) are used, affording a dyeing having a dull navy shade and poor chlorinated water and light fastness properties.

Example 2

100 parts of a mercerized cotton fabric are introduced at 20° to 25° C. into a solution of 0.6 part of dye (A), 1.2 parts of dye (B) and 50 parts of sodium sulfate decahydrate in 1,000 parts of water. 5 parts of anhydrous sodium carbonate and 1 part of an aqueous 32% strength sodium hydroxide solution are then added. With thorough agitation of the cotton material the dyebath is raised to 60° C. in the course of 15 minutes, and the dyeing is continued at that temperature for 90 minutes. Subsequently the dyed material obtained is finished in conventional manner, for instance as described in Example 1. This likewise gives a deep, uniform navy dyeing having the good fastness properties mentioned in Example 1.

Example 3

Example 1 is repeated, except that in place of the material to be dyed 200 parts of a fabric comprising a fiber mixture of 67 parts of polyester fibers and 33 parts of cotton are used, affording a dyeing having a uniform navy shade on the cotton portion and likewise having the good fastness properties mentioned in Example 1. The polyester fiber portion is separately dyed or cross-dyed in conventional manner with an appropriate disperse dye after or even before the fixing of the fiber-reactive dye mixture according to the invention; in this way the overall result obtained is a uniform solid dyeing in deep navy shades.

Examples 4 to 6

In each case Example 1 is repeated, except that the two dyes (A) and (B) are used in different mixing ratios, as indicated below in tabulated form. The results obtained in this way are likewise level dyeings without stripes and spots and with the good fastness properties mentioned in a hue indicated for the respective tabulated example.

| Example | Parts of dye (A) | Parts of dye (B) | Hue |
| --- | --- | --- | --- |
| 4 | 0.2 | 1.6 | Reddish navy |
| 5 | 0.4 | 0.4 | Lively navy |
| 6 | 1.1 | 0.7 | Greenish navy |

Example 7

A mercerized cotton fabric is padded at a temperature of about 20° C. with a wet pickup of 70% with a dyeing liquor which comprises 1,000 parts of water, 6 parts of the dye of the formula (C)

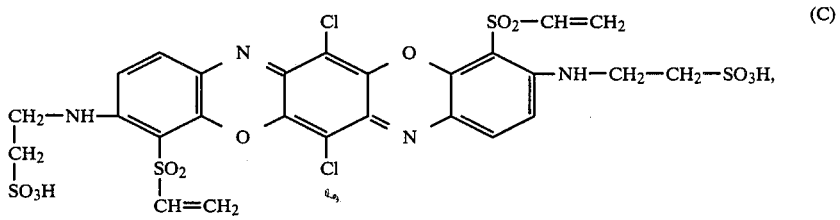

8 parts of the dye of the formula (B), 23 parts of an aqueous 32% strength sodium hydroxide solution, 130 parts of an aqueous sodium silicate solution having a content of 38° Bé and 3 parts of a commercially available wetting agent. The padded fabric is immediately wrapped up airtight in a plastic sheet and left to dwell at 20° C. for 16 hours. The dyed material is then finished in conventional manner, for instance as described in Example 1. The result obtained in this way is a deep navy dye of good levelness and good chlorinated water and light fastness properties.

Example 8

An aqueous print paste is prepared containing per 1,000 parts, in addition to water, 10 parts of the dye of the formula (D), 8 parts of the dye (E), 450 parts of an aqueous 4% strength sodium alginate thickening, 1 part of sodium hydrogenphosphate and 10 parts of the sodium salt of 2,4-dinitrobenzenesulfonic acid.

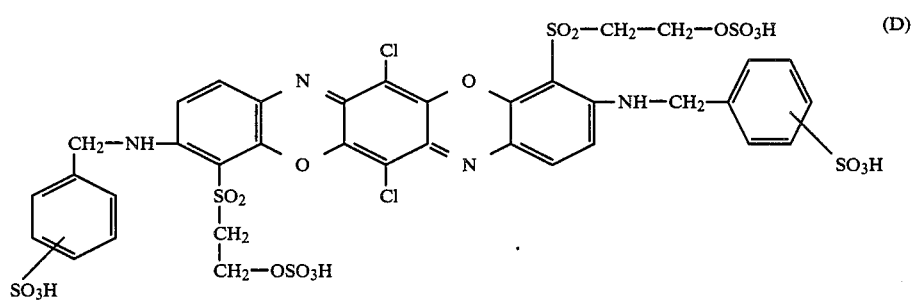

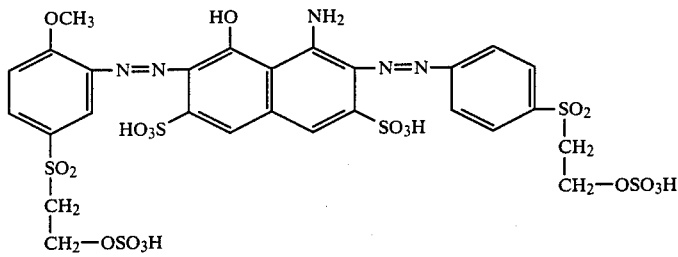

(E)

This print paste is used to screen print a mercerized cotton fabric. The printed fabric is subsequently steamed at 110° C. for 25 seconds and then overpadded with a solution comprising 1,000 parts of sodium chloride, 100 parts of anhydrous sodium carbonate, 50 parts of anhydrous potassium carbonate and 70 parts by volume of an aqueous 32% strength sodium hydroxide solution and 100 parts of water with a wet pickup of 70%, is then steamed once more at 110° C. for 8 seconds and is subsequently finished by rinsing with cold and warm water, by treatment at the boil in a wash solution containing a nonionic washing agent, by rinsing once more in warm and cold water and drying.

This gives a deep, greenish navy print of high levelness and good fastness properties, of which in particular the good light fastness is noteworthy.

Example 9

Instead of using solid dye powders of the individual dyes used according to the invention or solid mixtures thereof directly it was also possible beforehand to incorporate the dyes used according to the invention in an aqueous solution having a long shelf life. An aqueous solution of the dye mixtures according to the invention which has a long shelf life is obtained for example by dissolving appropriate amounts of the dye of the formula (A) and of the dye of the formula (B) or a mixture thereof in water in the presence of a buffer which is capable of bringing the solution to a pH value between 3 and 7 and maintaining said pH value, for example by dissolving 3.5 parts of the dye (A) and 6.5 parts of the dye (B) in 100 parts of water and subsequently setting the pH value with a potassium dihydrogenphosphate/-disodium hydrogenphosphate buffer to a pH value of 5. This long-shelflife liquid formulation of the dye mixture according to the invention can be used for dyeing cellulose fiber material, such as cotton, by one of the dyeing methods indicated in the previous Examples, without loss of dyeing properties even after a storage time of several weeks.

Examples 10 to 29

The tabulated Examples below describe, by means of general formulae mentioned in the description, further dye mixtures according to the invention which can be used in a manner according to the invention for dyeing cellulose fiber materials, for example in accordance with one of the dyeing methods described in the above work examples. They likewise produce strong dyeings of high levelness and good wet fastness properties, such as in particular good chlorinated water fastness, drylight and wetlight fastness, in the navy shade indicated for the respective tabulated Example.

| Example | Dye (I) conforming to general formula ... with ... | Dye (II) conforming to general formula ... with ... | Mixing ratio of (I):(II) | Shade |
|---|---|---|---|---|
| 10 | (Ia): <br> $Z = \beta$-sulfatoethyl <br> $R^1$ = hydrogen <br> $R^2 = \beta$-sulfatoethyl | (IIc): <br> $R^6$ = 3-chloro <br> $R^7$ = 4-sulfo | 1:1 parts | Greenish |
| 11 | (Ia): <br> $Z = \beta$-sulfatoethyl <br> $R^1$ = hydrogen <br> $R^2$ = sulfobenzyl | (IIa) <br> $Z' = 4$-$\beta$-sulfatoethyl—$SO_2$— <br> $R^4$ = hydrogen <br> $R^5$ = hydrogen | 0.7:1.3 parts | Reddish |
| 12 | (Ia) <br> $Z = \beta$-sulfatoethyl <br> $R_1$ = hydrogen <br> $R^2$ = sulfobenzyl | (IId): <br> $R^7$ = 4-sulfamoyl | 0.6:1.4 parts | Reddish |
| 13 | (Ia) <br> $Z = \beta$-sulfatoethyl <br> $R^1$ = hydrogen <br> $R^2 = \beta$-sulfoethyl | (IIa): <br> $Z' = 4$-$\beta$-sulfatoethyl—$SO_2$— <br> $R^4$ = hydrogen <br> $R^5$ = hydrogen | 1:1 parts | Greenish |
| 14 | (Ia): <br> $Z = \beta$-sulfatoethyl <br> $R^1$ = hydrogen <br> $R^2 = \beta$-sulfoethyl | (IIb): <br> $Z' = 3$-$\beta$-sulfatoethyl—$SO_2$— <br> $R^7$ = 4-sulfo | 0.8:1.2 parts | Greenish |
| 15 | (Ia): <br> $Z = \beta$-sulfatoethyl <br> $R^1$ = hydrogen <br> $R^2 = \beta$-sulfoethyl | (IIc): <br> $R^6$ = 3-chloro <br> $R^7$ = 4-sulfo | 0.9:1.1 parts | Greenish |
| 16 | (Ia): <br> $Z$ = vinyl <br> $R^1$ = hydrogen <br> $R^2 = \beta$-sulfoethyl | (IId): <br> $R^7$ = 4-sulfamoyl | 0.8:1.2 parts | Neutral |
| 17 | (Ia) <br> $Z$ = vinyl | (IIa): <br> $Z' = 4$-$\beta$-sulfatoethyl—$SO_2$— | 0.7:1.3 parts | Neutral |

-continued

| Example | Dye (I) conforming to general formula ... with ... | Dye (II) conforming to general formula ... with ... | Mixing ratio of (I):(II) | Shade |
|---|---|---|---|---|
| 18 | $R^1$ = hydrogen<br>$R^2$ = β-sulfoethyl<br>(Ia):<br>Z = vinyl | $R^4$ = hydrogen<br>$R^5$ = hydrogen<br>(IIa):<br>Z' = 4-β-sulfatoethyl—$SO_2$— | 0.8:1.2 parts | Neutral |
| 19 | $R^1$ = hydrogen<br>$R^2$ = β-sulfatoethyl<br>(Ia):<br>Z = β-sulfatoethyl | $R^4$ = hydrogen<br>$R^5$ = hydrogen<br>(IIa):<br>Z' = 4-β-sulfatoethyl—$SO_2$— | 1:1 parts | Greenish |
| 20 | $R^1$ = hydrogen<br>$R^2$ = β-sulfato-n-propyl<br>(Ia):<br>Z = β-sulfatoethyl | $R^4$ = hydrogen<br>$R^5$ = hydrogen<br>(IIa):<br>Z' = 4-β-sulfatoethyl—$SO_2$— | 0.7:1.3 parts | Neutral |
| 21 | $R^1$ = hydrogen<br>$R^2$ = β-carboxyethyl<br>(Ia):<br>Z = vinyl | $R^4$ = hydrogen<br>$R^5$ = hydrogen<br>(IIa):<br>Z' = 4-β-sulfatoethyl—$SO_2$— | 0.8:1.2 parts | Neutral |
| 22 | $R^1$ = methyl<br>$R^2$ = β-sulfoethyl<br>(Ia):<br>Z = β-sulfatoethyl | $R^4$ = hydrogen<br>$R^5$ = hydrogen<br>(IIa):<br>Z' = 4-β-sulfatoethyl—$SO_2$— | 0.6:1.4 parts | Reddish |
| 23 | $R^1$ = hydrogen<br>$R^2$ = carboxymethyl<br>(Ia):<br>Z = β-sulfatoethyl | $R^4$ = hydrogen<br>$R^5$ = hydrogen<br>(IIa):<br>Z' = 4-β-sulfatoethyl—$SO_2$— | 0.6:1.4 parts | Reddish |
| 24 | $R^1$ = hydrogen<br>$R^2$ = β-(sulfophenyl)-ethyl<br>(Ia):<br>Z = β-sulfatoethyl | $R^4$ = hydrogen<br>$R^5$ = hydrogen<br>(IIa):<br>Z' = 4-β-sulfatoethyl—$SO_2$— | 1.2:0.8 parts | Neutral |
| 25 | $R^1$ = hydrogen<br>$R^2$ = β,γ-di-sulfato-n-propyl<br>(Ia):<br>Z = β-sulfatoethyl | $R^4$ = hydrogen<br>$R^5$ = hydrogen<br>(IIa):<br>Z' = 4-β-sulfatoethyl—$SO_2$— | 1:1 parts | Greenish |
| 26 | $R^1$ = hydrogen<br>$R^2$ = β-phosphatoethyl;<br>(Ia):<br>Z = β-sulfatoethyl | $R^4$ = hydrogen<br>$R^5$ = hydrogen<br>(IId):<br>$R^7$ = 4-sulfamoyl | 0.7:1.3 parts | Neutral |
| 27 | $R^1$ = hydrogen<br>$R^2$ = β-sulfatoethyl<br>(Ia):<br>Z = vinyl | (IId):<br>$R^7$ = 4-sulfamoyl | 0.7:1.3 parts | Neutral |
| 28 | $R^1$ = hydrogen<br>$R^2$ = β-sulfatoethyl<br>(Ia):<br>Z = β-sulfatoethyl<br>$R^1$ = hydrogen<br>$R^2$ = β-sulfatoethyl | (IIb):<br>Z' = 3-β-sulfatoethyl—$SO_2$—<br>$R^7$ = 4-sulfo | 0.9:1.1 parts | Greenish |

Example 29

50 parts of a bleached cotton fabric are introduced into a solution of 0.8 part of the dye of the formula (F) and 0.8 part of the dye (B) mentioned in Example 1, in 500 parts of water and are briefly agitated therein.

A solution of 50 parts of sodium chloride and 5 parts of anhydrous sodium carbonate in 50 parts of water is then added, and the dyebath is heated with thorough agitation of the cotton material to 60° C. in the course of 30 minutes, the dreing temperature is maintained for a further 20 minutes and 1 part by volume of an aqueous 32% strength sodium hydroxide solution is then added, the dyeing temperature is maintained with further agitation of the material to be dyed at 60° C. for a further 40 minutes, and the dyed material is them removed from the bath and finished in conventional manner.

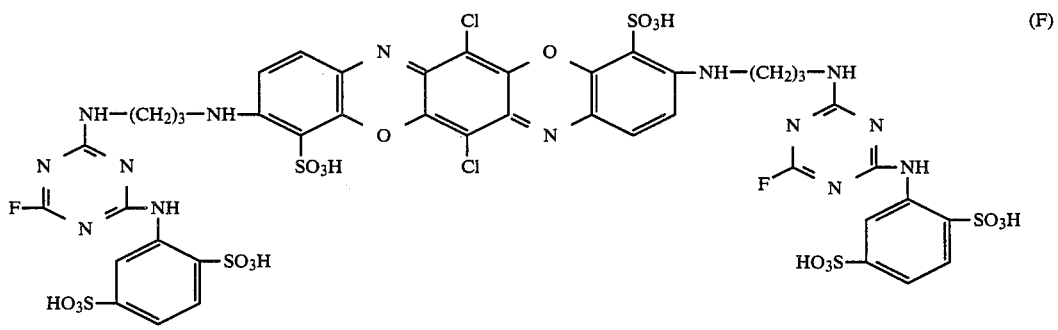

(F)

This gives a deep, level dyeing in a brilliant navy shade.

Examples 30 to 37

The tabulated Examples below describe, by means of general formulae mentioned in the description, further dye mixtures according to the invention which can be used in a manner according to the invention for dyeing cellulose fiber materials, for example in accordance with one of the dyeing methods described in the above worked Examples. They likewise produce strong dyeings of high levelness and good wet fastness properties, such as in particular good chlorinated water fastness, drylight and wetlight fastness, in the navy shade indicated for the respective tabulated Example.

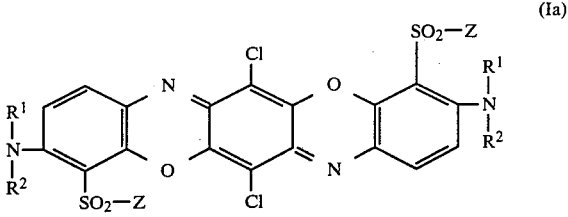

(Ia)

| Example | Dye (I) conforming to general formula . . . with . . . | Dye (II) conforming to general formula . . . with . . . | Mixing ratio of (I):(II) | Shade |
|---|---|---|---|---|
| 30 | (Ib): <br> R = sulfo <br> n = 3 <br> $R^1$ = hydrogen <br> $R^3$ = 2,5-disulfophenyl | (IIc): <br> $R^6$ = 3-chloro <br> $R^7$ = 4-sulfo | 1:1 parts | Greenish |
| 31 | (Ib): <br> R = N—(β-sulfatoethyl)-sulfamoyl <br> n = 3 <br> $R^1$ = hydrogen <br> $R^3$ = 2,5-disulfophenyl | (IIc): <br> $R^6$ = 3-chloro <br> $R^7$ = 4-sulfo | 0.9:1.1 parts | Greenish |
| 32 | (Ib): <br> R = N—(β-sulfatoethyl)-sulfamoyl <br> n = 3 <br> $R^1$ = hydrogen <br> $R^3$ = 2,5-disulfophenyl | (IIa): <br> Z' = 4-β-sulfatoethyl—$SO_2$— <br> $R^4$ = hydrogen <br> $R^5$ = hydrogen | 0.8:1.2 parts | Neutral |
| 33 | (Ib): <br> R = N—(β-sulfoethyl)-sulfamoyl <br> n = 3 <br> $R^1$ = hydrogen <br> $R^3$ = 4-sulfophenyl | (IIa): <br> Z' = 4-β-sulfatoethyl—$SO_2$— <br> $R^4$ = hydrogen <br> $R^5$ = hydrogen | 0.7:1.3 parts | Neutral |
| 34 | (Ib): <br> R = sulfo <br> n = 2 <br> $R^1$ = hydrogen <br> $R^3$ = 2,5-disulfophenyl | (IIa): <br> Z' = 4-β-sulfatoethyl—$SO_2$— <br> $R^4$ = hydrogen <br> $R^5$ = hydrogen | 0.6:1.4 parts | Reddish |
| 35 | (Ib): <br> R = N—(β-sulfatoethyl)-sulfamoyl <br> n = 3 <br> $R^1$ = hydrogen <br> $R^3$ = 2,5-disulfophenyl | (IIa): <br> Z' = 4-β-sulfatoethyl—$SO_2$— <br> $R^4$ = hydrogen <br> $R^5$ = hydrogen | 1.1:0.9 parts | Neutral |
| 36 | (Ib): <br> R = N—(β-sulfatoethyl)-sulfamoyl <br> n = 3 <br> $R^1$ = hydrogen <br> $R^3$ = 2,5-disulfophenyl | (IId): <br> $R^7$ = 4-sulfamoyl | 1:1 parts | Greenish |
| 37 | (Ib): <br> R = N—(β-sulfoethyl)-sulfamoyl <br> n = 3 <br> $R^1$ = hydrogen <br> $R^3$ = 4-sulfophenyl | (IId): <br> $R^7$ = 4-sulfamoyl | 1:1 parts | Greenish |

We claim:

1. A composition of water-soluble fiber-reactive dyes, which contains or substantially comprises one or more dyes which are selected from dyes of the formulae (Ia) and (Ib), and one or more dyes which are selected from dyes of the formulae (IIa), (IIb), (IIc) and (IId), in a ratio of 90:10 to 10:90 parts by weight of dyes (I) and (II):

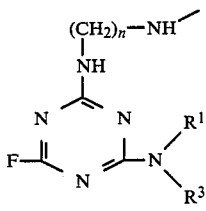

(Ib)

-continued

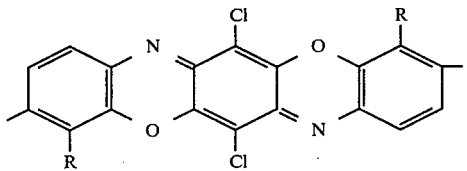

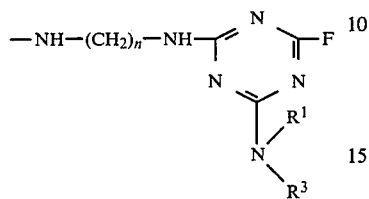

(IIa)
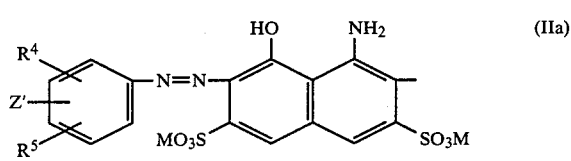

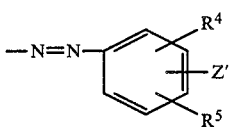

(IIb)
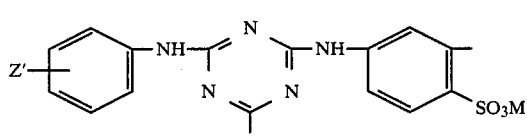

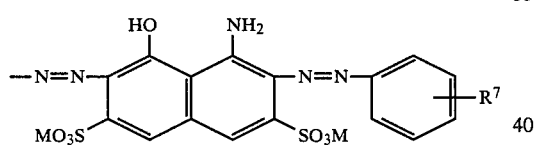

(IIc)
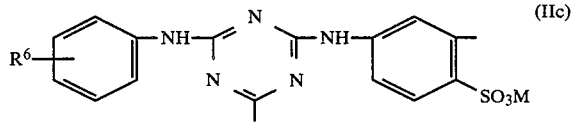

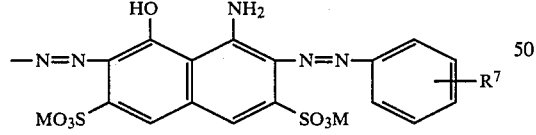

(IId)

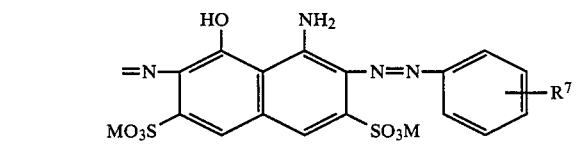

in which

Z is the vinyl—$SO_2$-group or the β-sulfatoethyl—$SO_2$-group,

Z' is the vinyl group or the β-sulfatoethyl group,

R stands for the sulfo group or a sulfonamide group of the formula (III)

in which
$R^8$ is a hydrogen atom or a substituted or unsubstituted alkyl group of 1 to 4 carbon atoms, and $R^9$ denotes an alkyl group of 1 to 4 carbon atoms which may be substituted by 1 or 2 substituents selected from sulfato, sulfo, carboxyl and phosphato, or is an aryl group which may be substituted by 1, 2 or 3 substituents selected from sulfo and carboxyl, or is an aryl-substituted alkyl group of 1 to 4 carbon atoms which may be substituted in the aryl radical by 1, 2 or 3 substituents selected from sulfo and carboxyl, $R^1$ is a hydrogen atom or a substituted or unsubstituted alkyl group of 1 to 4 carbon atoms, $R^2$ is an alkyl group of 1 to 4 carbon atoms which may be substituted by 1 or 2 substituents selected from sulfato, sulfo, carboxyl and phosphato, or is an aryl group which may be substituted by 1, 2 or 3 substituents selected from sulfo and carboxyl, or is an aryl-substituted alkyl group of 1 to 4 carbon atoms which may be substituted in the aryl radical by 1, 2 or 3 substituents selected from sulfo and carboxyl, $R^3$ is an alkyl group of 1 to 4 carbon atoms which may be substituted by 1 or 2 substituents selected from sulfato, sulfo, carboxyl and phosphato, or is a phenyl group which is substituted by 1 or 2 substituents selected from sulfo and carboxyl, $R^4$ is a hydrogen atom or a sulfo group, a carboxyl group, an alkyl group of 1 to 4 carbon atoms, an alkoxy group of 1 to 4 carbon atoms or a bromine atom, $R^5$ is a hydrogen atom or a sulfo group, a carboxyl group, an alkyl group of 1 to 4 carbon atoms, an alkoxy group of 1 to 4 carbon atoms or a bromine atom, $R^6$ is an alkyl group of 1 to 4 carbon atoms, a hydroxyl group, a carboxyl group, a sulfo group or a chlorine atom, $R^7$ is a sulfo group, a sulfonamide group conforming to the formula (III) mentioned and defined above or is a carboxyl group, n stands for the number 1, 2 or 3

M is a hydrogen atom or an alkali metal.

2. The composition as claimed in claim 1 having mixing ratios of the dyes of the formulae (I) and (II) between 30:70 and 60:40 parts by weight.

3. The composition as claimed in claim 1 having mixing ratios of the dyes of the formulae (I) and (II) between 30:70 and 50:50 parts by weight.

4. The composition according to claim 1, wherein, in the dyes of the formulae (I) and (II), the formula radicals Z are each a β-sulfatoethyl group, and the formula radicals Z' are each a β-sulfatoethyl—$SO_2$-group.

5. The composition according to claim 1, wherein, in the dyes of the formulae (I), $R^1$ denotes a hydrogen atom and R denotes a sulfo group.

6. The composition according to claim 1, wherein, in the dyes of the general formulae (I), $R^2$ stands for a β-sulfoethyl, β-sulfatoethyl, β-sulfatopropyl, carboxymethyl, β-carboxyethyl, γ-carboxypropyl, monosulfophenyl, monosulfobenzyl or β-(monosulfophenyl)ethyl group and $R^3$ denotes the 2,5-disulfophenyl group.

7. The composition according to claim 1, wherein, in the dyes of the formulae (II), $R^4$ and $R^5$ each denote a hydrogen atom, $R^6$ is a chlorine atom in the meta-position relative to the amino group and $R^7$ denotes a sulfo group or a sulfonamide group of the formula (III) which is mentioned in claim 1 and in which $R^8$ stands for a hydrogen atom and $R^9$ is defined as in claim 1.

8. The composition according to claim 1, wherein the dye conforming to one of the formulae (I) is a dye of the formula (IV)

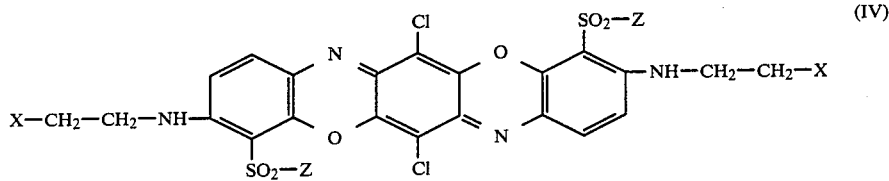

(IV)

and the dye conforming to a formula (II) is a dye of the formula (V)

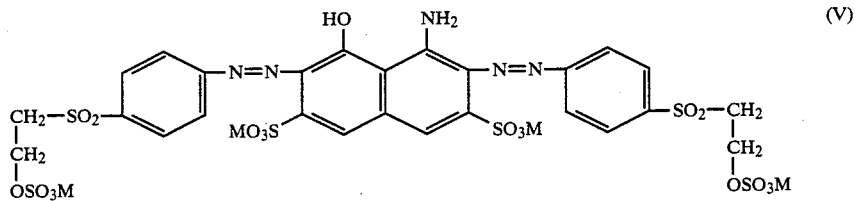

(V)

in which M has the meaning mentioned in claim 1, X stands for the sulfo or sulfato group and Z is the β-sulfatoethyl group.

9. The composition as claimed in claim 1, wherein the dyes (I) and (II) defined in claim 1 are present in the form of an aqueous solution having a total dye content of 10 to 40% by weight and a pH value between 4 and 7.

10. A method for using the composition defined in claim 1, which comprises dyeing carboxamide-containing or hydroxyl-containing fiber materials with the composition.

11. The method of use as claimed in claim 10, wherein cellulose fiber materials are dyed under alkaline dyeing conditions.

12. The method of use as claimed in claim 11, wherein cellulose fiber materials are dyed by the exhaust method.

13. A method for using the composition defined in claim 1, which comprises printing carboxamide-containing or hydroxyl-containing fiber materials with the composition.

14. A process for dyeing (including printing) a fiber-material containing hydroxyl and/or carboxamide groups, which comprises applying a mixture of dyes (I) and (II) as defined in claim 1, or said individual dyes simultaneously, in aqueous solution on said fiber-material and fixing the dyes on said material by the action of heat or an acid binding agent or by both.

* * * * *

UNITED STATES PATENT AND TRADEMARK OFFICE
CERTIFICATE OF CORRECTION

PATENT NO. : 4,705,524

DATED : NOVEMBER 10, 1987

INVENTOR(S) : HAHNKE ET AL

It is certified that error appears in the above-identified patent and that said Letters Patent is hereby corrected as shown below:

Column 20, lines 1 through 3, "Z is the vinyl-$SO_2$-group or the $\beta$-sulfatoethyl-$SO_2$ group, A' is the vinyl group or the $\beta$-sulfatoethyl group,"

should read,

--Z is the vinyl group or the $\beta$-sulfatoethyl group, Z' is the vinyl-$SO_2$-group or the $\beta$-sulfatoethyl-$SO_2$-group,--.

Signed and Sealed this

Sixteenth Day of May, 1989

Attest:

DONALD J. QUIGG

Attesting Officer

Commissioner of Patents and Trademarks